United States Patent
Schuh

[11] Patent Number: 5,857,777
[45] Date of Patent: Jan. 12, 1999

[54] SMART TEMPERATURE SENSING DEVICE

[75] Inventor: William C. Schuh, Delvan, Wis.

[73] Assignee: Claud S. Gordon Company, Richmond, Ill.

[21] Appl. No.: 718,921

[22] Filed: Sep. 25, 1996

[51] Int. Cl.$^6$ .............................. G01K 7/00; G01K 7/22; G01K 7/14
[52] U.S. Cl. .................... 374/172; 374/170; 374/179; 374/183
[58] Field of Search ................................ 374/1, 158, 163, 374/171, 172, 173, 175, 179, 183, 208; 364/557, 558

[56] References Cited

U.S. PATENT DOCUMENTS

| | | | |
|---|---|---|---|
| 4,210,024 | 7/1980 | Ishiwatari et al. | 374/1 |
| 4,303,984 | 12/1981 | Houvig | 364/558 |
| 4,443,117 | 4/1984 | Muramoto et al. | 374/1 |
| 4,541,734 | 9/1985 | Ishizaka | 374/172 |
| 4,559,954 | 12/1985 | Murase | 374/172 |
| 4,728,881 | 3/1988 | Evans et al. | 374/1 |
| 4,875,042 | 10/1989 | Oku et al. | 374/175 |
| 4,958,936 | 9/1990 | Sakamoto et al. | 374/1 |
| 5,056,048 | 10/1991 | Seperant | 364/557 |
| 5,271,407 | 12/1993 | Pompei et al. | 374/158 |
| 5,332,315 | 7/1994 | Baker et al. | 374/208 |
| 5,361,218 | 11/1994 | Tripp et al. | |
| 5,425,375 | 6/1995 | Chin et al. | 364/557 |
| 5,498,079 | 3/1996 | Price | 374/208 |
| 5,655,305 | 8/1997 | Fletcher | 374/1 |
| 5,655,841 | 8/1997 | Storm | 374/172 |

FOREIGN PATENT DOCUMENTS

| | | | |
|---|---|---|---|
| 58-68633 | 4/1983 | Japan | 374/172 |
| WO 94/12940 | 9/1994 | WIPO . | |

*Primary Examiner*—G. Bradley Bennett
*Attorney, Agent, or Firm*—Renner, Otto, Boisselle & Sklar, P.L.L.

[57] ABSTRACT

A smart temperature sensing device 10 includes a sensor 16 and a memory 25 on a sensor unit 14. The memory contains a plurality of custom nonlinear calibration coefficients which uniquely characterize the sensor 16. A temperature system includes the smart temperature sensing device 10 and a FSAU 12 having a processor 28 which downloads the calibration coefficients and utilizes them in converting electrical signals from the sensor 16 into temperature values that represent the temperature at the sensor 16. A method of calibrating a sensor 16 includes measuring an output signal of the sensor 16 over a temperature range, thereby obtaining a plurality of paired data points. The paired data points are used in a curve-fitting algorithm to obtain coefficients to a polynomial that characterizes the nonlinear temperature-voltage relationship of the sensor 16. The coefficients are stored within the memory 25 until downloaded by the processor 28 for use in signal conversion.

21 Claims, 4 Drawing Sheets

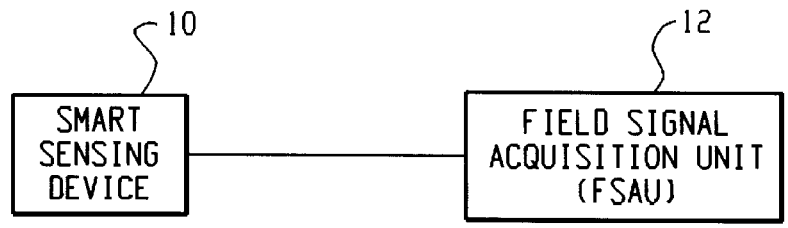
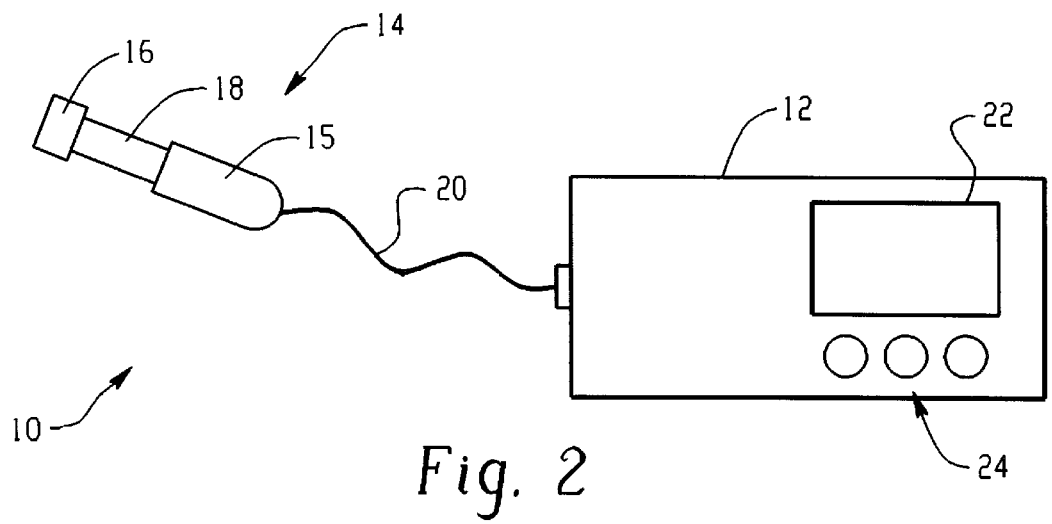
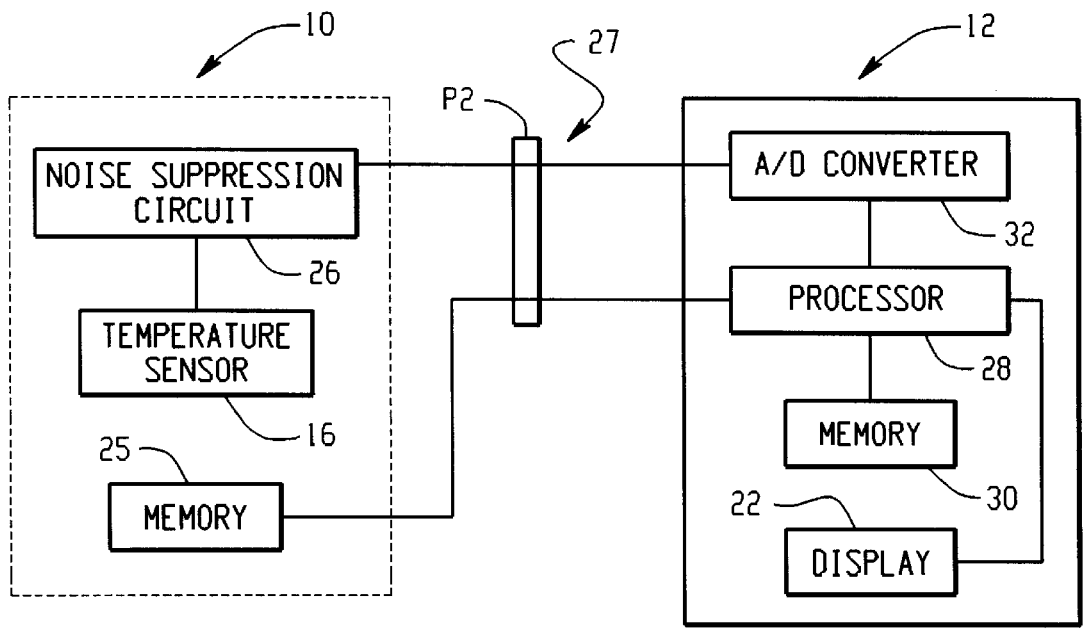

| CALIBRATION TEMPERATURE (C°) | OUTPUT (mV) | COEFFICIENTS |
|---|---|---|
| 279.4446 | 11.331 | $C0 = 1.7005202 \times 10^{-6}$ |
| 279.4830 | 11.332 | |
| 258.8511 | 10.499 | $C1 = 2.8218014 \times 10^{1}$ |
| 258.8892 | 10.498 | |
| 233.8727 | 9.488 | $C2 = -2.2030162 \times 10^{0}$ |
| 233.9105 | 9.488 | |
| 208.9653 | 8.485 | $C3 = 4.4069171 \times 10^{-1}$ |
| 208.9948 | 8.486 | |
| 189.2708 | 7.701 | $C4 = -3.6285769 \times 10^{-2}$ |
| 189.2708 | 7.701 | |
| 169.2308 | 6.908 | $C5 = 1.0685829 \times 10^{-3}$ |
| 169.2202 | 6.909 | |
| 152.2747 | 6.231 | $C6 = 0$ |
| 152.2773 | 6.232 | |
| 97.7441 | 4.005 | $C7 = 0$ |
| 97.7596 | 4.005 | |
| | | $C8 = 0$ |

SMART TEMPERATURE SENSING DEVICE

FIELD OF THE INVENTION

This invention generally relates to a temperature sensing device. More particularly, the invention relates to a pre-programmed smart temperature sensor having custom calibration coefficients uniquely characterizing the sensor stored in a memory local to the sensor.

BACKGROUND OF THE INVENTION

Many applications require sensing of a temperature to effectuate a task. One typical way of sensing a temperature is to place a temperature sensor within the environment to be sensed. The temperature sensor conveys an electrical signal, which is indicative of the temperature of the environment, to electrical conversion circuitry which converts the electrical signal into a temperature and subsequently displays it to a user. A problem often arises, however, in that many conventional prior art temperature sensing solutions do not provide for highly accurate temperature readings because the sensors are not adequately calibrated for use with the electrical conversion circuitry.

One prior art solution to this problem was to calibrate a given sensor over a temperature range by placing general calibration information into a memory associated with the conversion circuitry. This general calibration information suffered from the drawback that each sensor in use is not identical, but rather has its own internal variations. Therefore, the general calibration data used within the electrical conversion circuity did not provide for an accurate temperature reading for any one particular sensor.

Another solution involved calibrating a given sensor over a number of different temperatures and storing calibration information within a memory associated with the electrical conversion circuitry. In this manner, the sensor was calibrated and had unique calibration information associated with it in the electrical conversion circuitry. This solution, however, suffered from the drawback that the useful life of a sensor is often substantially shorter than the useful life of the conversion circuitry. Therefore, when a sensor needed to be replaced, the unique calibration information within the electrical conversion circuitry was no longer applicable to a replacement sensor. Whenever a sensor needed to be replaced (which was frequent), a user needed to replace both the sensor and the substantially more expensive electrical conversion circuitry. This resulted in high cost and expense to the user.

In addition to the above prior art limitations, prior art methods of calibrating a sensor consisted of using linear approximations to characterize a sensor over a temperature range. In this manner, typical linear conversion methodologies such as look-up tables were utilized, but the linear approximations provided poor accuracy since temperature sensors do not behave linearly over a broad range of temperatures. Therefore, even when a sensor was calibrated, its calibration consisted of inaccurate linear approximations.

SUMMARY OF THE INVENTION

In one aspect of the invention, a temperature sensing device includes a sensor and a memory coupled together on a holder, wherein the memory contains a plurality of custom calibration coefficients which uniquely characterize the sensor. The smart sensing device may also have a remote processor coupled to the sensor. The remote processor is operable to access the plurality of calibration coefficients from the memory and an electrical signal from the sensor. The remote processor calculates the temperature value at the sensor by utilizing the calibration coefficients in conjunction with the electrical signal. The sensor and the memory are resident together on the holder used in taking the thermal measurement; therefore the sensor and memory are local to the sensed environment while the processor is remote from the holder, yet remains in electrical communication with the sensor and the memory. The memory may also contain other pieces of custom data which is uniquely associated with the sensor such as time constant data, maintenance data, intended use data, regulatory data or cold junction compensation coefficients to further aid in accurately determining the temperature at the sensor and improve sensor reliability.

In another aspect of the invention, a method of calibrating a thermal sensor includes measuring an output signal of the sensor over a temperature range, thereby obtaining a plurality of paired data points. The method also includes the step of utilizing the paired data points in a mathematical curve fitting algorithm to obtain coefficients to a polynomial that characterizes the performance of the sensor over the temperature range. The calibration coefficients are then stored within a memory which is associated with the sensor.

In yet another aspect of the invention, a method of making thermal measurements includes a step of sending calibration data from a sensor to a processor, wherein the calibration data represents calibration information which uniquely characterizes the sensor. The method also includes the steps of measuring a temperature at the sensor, communicating an electrical signal from the sensor to the processor, and converting the electrical signal into a temperature reading via the processor by utilizing the calibration data in a conversion algorithm.

In a further aspect of the invention, a method of providing custom calibration sensors for measuring temperature includes the step of measuring a voltage or resistance value of a thermal sensor over a range of temperatures, and calculating a plurality of custom calibration coefficients which uniquely characterize the sensor using the calibration coefficients. The method also includes the step of storing the custom calibration coefficients in the memory associated with the sensor.

BRIEF DESCRIPTION OF THE DRAWINGS

In the annexed drawings:

FIG. 1 is a block diagram illustrating a smart temperature sensing device coupled to a field signal acquisition unit in accordance with the present invention;

FIG. 2 is a schematic diagram illustrating the smart temperature sensing device coupled to the field signal acquisition unit;

FIG. 3 is a detailed block diagram of the smart temperature sensing device and the field signal acquisition unit;

DETAILED DESCRIPTION OF THE INVENTION

Figures 4, 5:
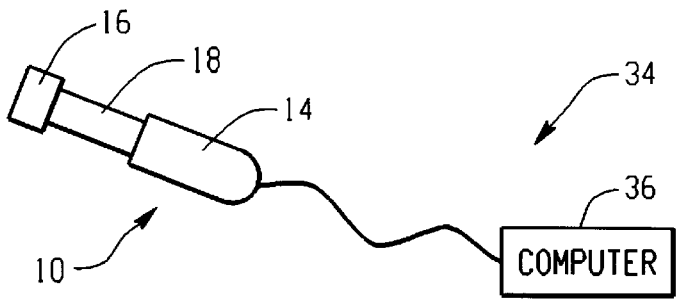
FIG. 4 is a schematic diagram illustrating the smart temperature sensing device coupled to a computer.
FIG. 5 is a table illustrating a plurality of paired temperature data points and calibration coefficients.

The invention relates to a calibrated smart temperature sensing device having nonlinear calibration data which reflects a historical nonlinear behavior of a class of sensors over a temperature range. The nonlinear calibration data (or coefficients) are stored in a memory within a sensor unit which includes a sensor. When in use, the smart temperature sensing device is in electrical communication with a field signal acquisition unit (or conversion circuitry) which downloads the calibration coefficients from the memory of the smart temperature sensing device. The smart temperature sensing device transfers a signal to the field signal acquisition unit which is indicative of the temperature at the sensor which converts the signal into a temperature using the nonlinear calibration coefficients of the smart temperature sensing device.

The smart temperature sensing device may alternatively contain custom calibration data which uniquely characterizes the sensor. Prior to use, the smart temperature sensing device is calibrated over a range of temperatures by measuring its output signal over a temperature range and calculating custom nonlinear calibration coefficients. The calculation of the custom nonlinear calibration coefficients may be accomplished using a least squares fitting algorithm. The calibration coefficients uniquely characterize the sensor and are stored in the memory within the sensor unit. The smart temperature sensing device provides high accuracy by using the custom calibration coefficients that uniquely characterize each sensor. Further, the custom calibration coefficients provide high accuracy because they are nonlinear coefficients that satisfy a polynomial which accurately characterizes the nonlinear behavior of the sensor over the temperature range.

The smart temperature sensing device may also provide additional information to the field signal acquisition unit; such additional information includes: a time constant for sensor speed of response, maintenance data based on the sensor type, intended use environment data for sensor drift, regulatory information that may be specific to a particular customer, and cold junction compensation coefficients for thermocouple-type sensors.

FIG. 1 is a block diagram illustrating a smart temperature sensing device 10 coupled to a field signal acquisition unit (FSAU) 12. The smart temperature sensing device 10 senses a temperature of its environment and sends an analog electronic signal to the FSAU 12. The FSAU 12, in turn, converts the electrical signal from the smart sensing device 10 into a value indicative of the temperature of the environment.

FIG. 2 is a schematic diagram illustrating in greater detail the smart temperature sensing device 10 coupled to the FSAU 12. The smart temperature sensing device 10, in one embodiment, comprises a sensor unit 14 including a handle portion 15 and a temperature sensor 16 coupled together via a spacer portion 18. The spacer portion 18 serves to provide a suitable distance between the handle portion 15 and the temperature sensor 16 under circumstances in which the thermal environment at the temperature sensor portion 16 is substantially hot or cold to protect any plastic materials, electronics, or potting compounds associated with the sensor unit 14 from thermal damage and protect a user's hand on the handle portion 15 from suffering any discomfort. Alternatively, the smart temperature sensing device 10 could operate without the spacer portion 18 and thereby incorporate the handle portion 15 and the temperature sensor 16 together on or within the same sensor unit 14. In an alternative embodiment, the smart temperature sensing device 10 may further isolate the sensor unit 14 from the temperature sensor 16 by incorporating each into separate housings or subunits, wherein both remain separate from the FSAU 12.

The smart temperature sensing device 10 is coupled to the FSAU 12 through a wire connector 20. The FSAU 12 includes a display 22, control knobs 24, and conversion circuitry (not shown) which is internal to the FSAU 12 and converts the analog electrical signal from the smart temperature sensing device 10 into a value representative of the temperature at the temperature sensor 16. The FSAU 12 displays the temperature on the display 22 and the control knobs 24 (which are optional) are used to alter the contrast of the display 22, convert the temperature display from degrees Farenheight to degrees Celsius or alternatively to degrees Kelvin, or provide other control functions. Alternatively, the FSAU 12 may include additional buttons or other control indicia to effectuate conversion functions.

FIG. 3 is a block diagram illustrating the internal circuity of both the smart temperature sensing device 10 and the FSAU 12. The smart temperature sensing device 10 has a memory 25 and the temperature sensor 16 coupled to a noise suppression circuit 26. The memory 25 and the noise suppression circuit 26 are connected to the FSAU 12 through a P2 connector 27, which is a common parallel-type connector, which couples the smart temperature sensing device 10 and the FSAU 12 together. Alternatively, a different type of connector may also be utilized such as a bundled wire harness. The FSAU 12 includes a processor 28 connected to a memory 30, an analog-to-digital converter 32, and the display 22. The memory 25 of the smart temperature sensing device 10 is coupled to the processor 28 via the P2 connector 27, and the noise suppression circuit 26 is coupled to the analog-to-digital converter 32 as well. Alternatively, the memory 25 may be located in either the handle portion 15, the spacer portion 18 or the connector 27 where, in each case, the memory 25 is separate from the FSAU 12.

The smart temperature sensing device 10 works in conjunction with the FSAU 12 in the following manner. The memory 25 of the smart temperature sensing device 10 contains, in one embodiment, historical calibration data that characterizes the nonlinear behavior of a class of sensors over temperature. For example, if the temperature sensor 16 is a thermocouple-type sensor, the nonlinear historical calibration data represents the average nonlinear behavior of many thermocouple-type sensors that have been calibrated in the past. In this manner, the historical calibration data represents the average nonlinear behavior for thermocouple-type sensors. Similarly, different nonlinear historical calibration data will be used for other type temperature sensors 16 such as an RTD-type temperature sensor. In another embodiment, the memory 25 of the smart temperature sensing device 10 contains custom calibration data which uniquely characterizes the nonlinear behavior of the temperature sensor 16. Calibration coefficients are determined and loaded into the memory 25; how this is accomplished will be discussed infra. Upon initially coupling the smart temperature sensing device 10 to the FSAU 12 (via the P2 connector 27) the processor 28 immediately accesses the memory 25 to download the custom calibration coefficients resident within the memory 25 into the memory 30 of the FSAU 12. The temperature sensor 16, upon being placed in its respective temperature environment, senses the temperature and outputs an analog electrical signal indicative of the temperature. The analog electrical signal, in a preferred embodiment, passes through the noise suppression circuit 26, which effectively filters the analog electrical signal, preferably through a band-pass filter arrangement, and eliminates noise associated with the signal. The noise suppression circuit 26 then passes the filtered electrical signal to the analog-to-digital converter 32 via the P2 connector 27. The analog-to-digital converter 32 converts the analog filtered electrical signal into a digital signal (or binary word) for the processor 28 which converts, using the custom calibration coefficients now resident within the memory 30, the digital signal into a temperature value which accurately represents the temperature of the environment at the temperature sensor 16. The processor 28 converts the electrical signal, which is a voltage (EMF) or resistance value, into a temperature through the following algorithm:

Temperature=$C0+C1*EMF+C2*EMF^2+C3*EMF^3+ \ldots +C8*EMF^8$, wherein C0, C1 . . . C8 represent the custom calibration coefficients and EMF represents the voltage value (typically in millivolts) or resistance value (in ohms). The processor 28 then displays that temperature value via the display 22.

The memory 25 within the smart temperature sensing device 10 may also contain additional data to provide improved conversion accuracy and system reliability. For example, the memory 25 may store a time constant associated with the particular temperature sensor 16. The time constant represents the time it takes for the temperature sensor 16 to respond to a change in temperature. The processor 28 may use the time constant data in at least two ways: first, if the temperature sensor 16 is sensing the temperature at a number of different temperature interactions, the processor 28 knows how long to wait to convert the signal from the temperature sensor 16 to ensure that the measurement is accurate. Second, if the processor 28 is also controlling the heating or cooling of an oven apparatus, it may use the time constant data in a temperature control algorithm to more precisely control the temperature.

Additional data within the memory 25 may consist of maintenance data regarding maintenance scheduling for the temperature sensor 16. For example, if the temperature sensor 16 should be tested or checked every "X" days, the memory 25 may download "X" to the processor 28 which will begin incrementing a clock. When the clock reaches "X", the processor 28 will communicate to the user via the display 22 that the temperature sensor 28 requires maintenance. The data within the memory 25 may include data for temperature sensor type ("X" days for RTDs, "Y" days for thermocouples, etc.) or sensor use (replace or repair every "Z" measurement).

In addition to the above options, the memory 25 may also contain intended use environment data. For example, temperature sensors 16 experience a known drift when measuring temperatures in a particular environment over time. The processor 28 may use this intended use environment data to approximately offset measured temperatures in that particular environment over time, thereby accurately taking into account drift within the particular temperature sensor 16. Because drift is a function of the particular environment, the temperature sensor 16 may be uniquely customized for a particular intended use environment.

Regulatory data specific to a particular customer may also be stored within the memory 25. For example, ISO-9000 specification requirements, internal quality control standards, or UL mandates may require that particular actions be taken at various times to monitor, replace or repair the temperature sensor 16. In a manner similar to the maintenance data, the processor 28 downloads this data and provides prompts to the user via the display 22 to ensure that the regulatory requirements are addressed. Such regulatory data may also include data on the date of the sensor's manufacture, its material lot, when and where it was tested, a serial number or other traceability information.

Cold junction compensation coefficients for thermocouples may also be downloaded into the memory 25. As is well known for a thermocouple-type sensor, a separate sensor is placed at the cold end of the thermocouple junction and the sensor must convert its output into an equivalent thermocouple signal in millivolts to subsequently calculate the temperature at its "hot" end. Since each style thermocouple (type K,C,J or T, for example) has its own unique conversion parameters, a universal conversion algorithm results in inaccuracies. Since each temperature sensor 16 (when using a thermocouple-type sensor) will know the style thermocouple being used, the unique compensation coefficient may be placed within the memory 25 for subsequent use by the processor 28. Therefore, a plethora of data may be placed within the memory 25 which is unique to each temperature sensor 16, thereby providing improved conversion accuracy and sensor reliability.

FIG. 4 illustrates a calibration system 34 having the smart temperature sensing device 10 coupled to a computer 36. The calibration system 34 is preferably utilized prior to sale of the smart temperature sensing device 10 such that purchase of the smart temperature sensing device 10 will include the custom calibration data already resident within the memory 25. The calibration system operates by placing the sensor unit 14 in a thermal environment having a known temperature. The sensor unit 14 outputs an analog signal to the computer 36 simultaneously with a recording of the known temperature by the computer 36. The thermal environment temperature is known to the computer 36 via a signal from a standard sensing device with verified calibration provided from a reference lab such as NIST. The calibration system 34 then increments the temperature of the thermal environment to a second known temperature and repeats the thermal measurement with the smart temperature sensing device 10. The calibration system 34 repeats the steps until a sufficient number of data points have been collected, whereby the computer 36 then has a number of signal values associated with a number of known temperatures (paired data points). The computer 36 uses an algorithm to calculate a plurality of calibration coefficients for a polynomial which represents a curve which matches the paired data points.

FIG. 5 is a table which represents the paired data points gathered from the calibration system 34 of FIG. 4. FIG. 5 has a calibration temperature column 38 which lists a plurality of calibration temperatures; when the calibration system 34 varies the temperature of the environment, that temperature is recorded in the calibration temperature column 38. A sensor output column 40 lists all the analog voltage signal values or resistance from the smart temperature sensing device 10 gathered during the recordation of the calibration system 34. In this manner, the table has a plurality of paired data points, namely the calibration temperature column 38 and the sensor output column 40, wherein an output voltage signal or resistance value is coupled or paired to each respective calibration temperature. The last column in FIG. 5 is a calibration coefficient column 42; the computer 36 of the calibration system 34 takes the values for the paired data points of calibration temperature column 38 and the sensor output column 40 and uses these paired data points to calculate the calibration coefficients. The computer 36 utilizes the plurality of paired data points, in a preferred embodiment, in a least squares fitting algorithm to find a polynomial of minimal degree of the form:

Temperature=C0+C1* EMF+C2* $EMF^2$+C3*$EMF^3$+ . . . +C8*$EMF^8$, wherein C0,C1, etc. are the calibration coefficients. The least squares fitting may also be artificially weighted so that the temperature at EMF=0 V is about 0° C. for thermocouple-type sensors. When higher order coefficients are equal to zero, it indicates that an acceptable curve fit was obtained with a polynomial of an order less than eight. The computer 36 downloads the calculated custom calibration coefficients into the memory 25 of the smart temperature sensing device 10 which is illustrated in conjunction with FIG. 6.

Figure 6:
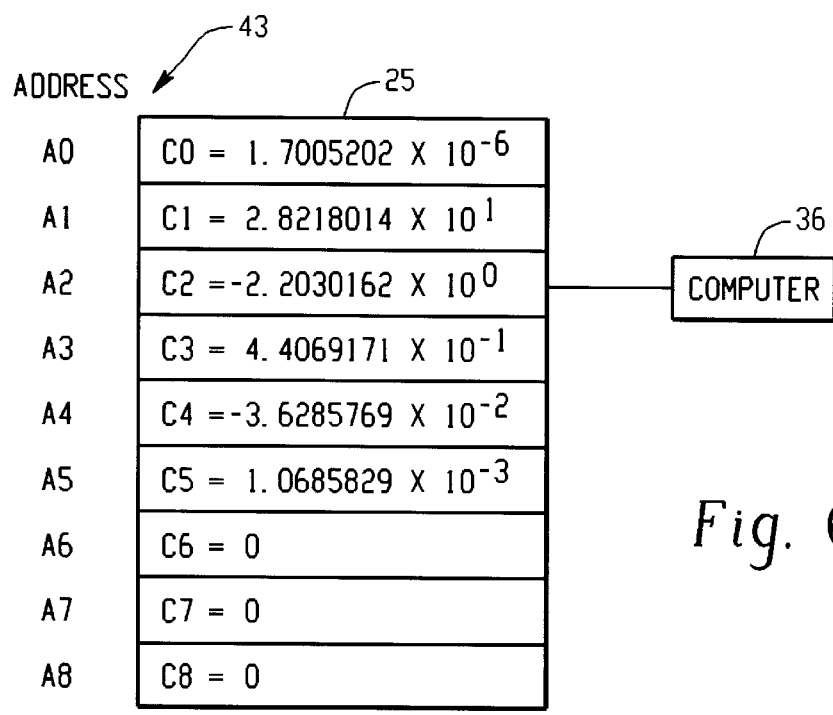
FIG. 6 is a schematic diagram illustrating the computer coupled to the memory of the smart temperature sensing device.

FIG. 6 is a block diagram illustrating the computer 36 connected to the memory 25 of the smart temperature sensing device 10. A memory address portion 43 is located within the memory 25 and represents predetermined, fixed addresses (A0–A8) at which the custom calibration coefficients reside within the memory 25. The processor 28 of the FSAU 12, when desiring to access the custom calibration coefficients of the memory 25, therefore knows where to look to find the custom calibration coefficients and other information unique to the particular temperature sensor 16.

Figure 7:
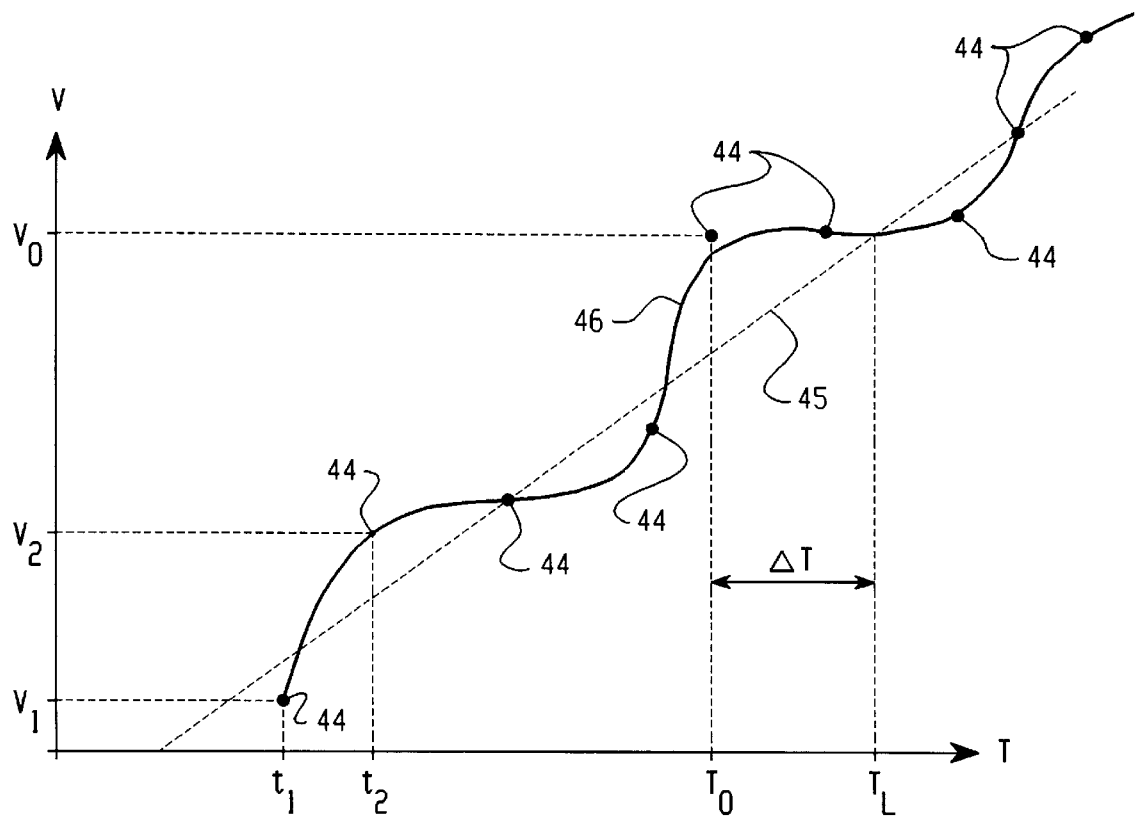
FIG. 7 is a graph exemplifying the error associated with linear approximations of the voltage-temperature relationship of sensors.

The use of custom, nonlinear calibration coefficients substantially improves the conversion accuracy over prior art linear methodologies. The improvement in conversion accuracy is illustrated in FIG. 7, which is a graph illustrating a thermocouple-type sensor as an example, having temperature (T) on the X-axis and the signal voltage (V) on the Y-axis. On the graph is a plurality of paired data points 44 $(t_1,v_1)$, $(t_2,v_2)$, etc. collected in the manner described above in conjunction with FIGS. 4 and 5. In prior art linear approximations, a straight line approximation 45 is made using the paired data points. Then, when a voltage signal is received $(V_0)$ the corresponding temperature $(T_L)$ on the straight line 45 is determined. As can be seen by the plurality of data points on this graph, however, the temperature sensor 16 does not behave in a perfectly linear manner over its temperature range, but rather behaves nonlinearly. In this particular example utilizing the nonlinear coefficients, the voltage signal $(V_0)$ corresponds to a temperature $T_0$ which is lower than $T_L$. The nonlinear coefficients for the polynomial that characterize the nonlinear voltage-temperature relationship 46 eliminate the error ($\Delta T$) associated with prior art linear approximations.

Figure 8:
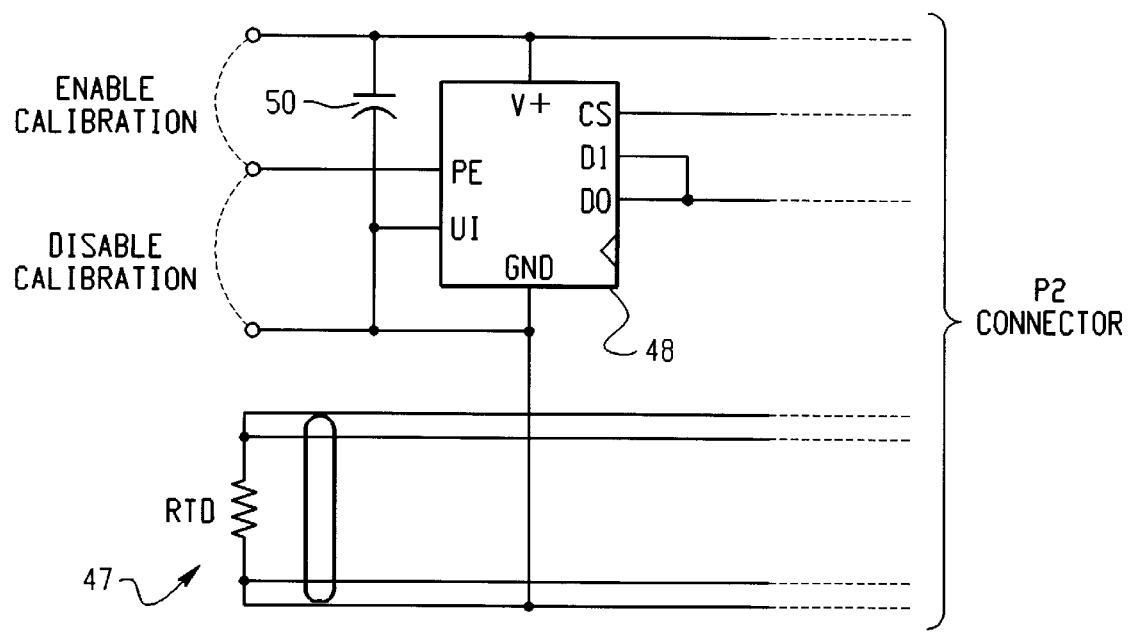
FIG. 8 is a schematic diagram illustrating in greater detail the smart temperature sensing device, illustrating the memory and an RTD-type temperature sensor.

FIG. 8 is a schematic diagram showing in detail the smart temperature sensing device 10 of FIG. 3, namely a resistance temperature device (RTD) 47 coupled to an EEPROM 48. The RTD 47 and the EEPROM 48 represent a detailed representation of the temperature sensor 16 coupled to the memory 25 within the handle portion 14 (or alternatively a separate subunit) of the smart temperature sensing device 10 of FIGS. 2 and 3. The EEPROM 48 operates in conjunction with the RTD 47 in the following manner. After the computer 36 has gathered the paired data points and calculated the calibration coefficients associated with the particular probe, which in this case is the RTD 47, and the user wishes to enable the calibration, the user places a jumper between the part enable pin and the power supply which is coupled to the voltage supply pin of the EEPROM 48. The chip select pin is driven high (by the computer 36) and the calibration coefficient data is incrementally read in (or clocked) through the D0 and D1 pins. When all the calibration coefficient data has been read into the EEPROM 48, the user disconnects the jumper between the part enable pin up and the power supply and subsequently places the jumper between the part enable pin and the ground pin which disables the downloading of calibration coefficients into the memory 25.

Upon power-up, the processor 28 reads and downloads the calibration coefficients resident within the EEPROM 48 into the memory 30 associated with the FSAU 12. The processor 28 pulls the chip select pin low which enables data to be read from the memory 25. The calibration coefficient data is clocked out of the D0 and D1 pins and stored in the memory 30 for use by the processor 28. In this manner, the EEPROM 48 communicates the custom calibration coefficients to the processor 28 for use in converting analog signals received from the temperature sensor 16. The RTD 47, in this particular embodiment, senses the temperature by generating the analog signal and communicates that either directly to the analog-to-digital converter 32 or alternatively may send that to the analog-to-digital converter 32 via the noise suppression circuit 26, as illustrated in FIG. 3.

Figure 9:
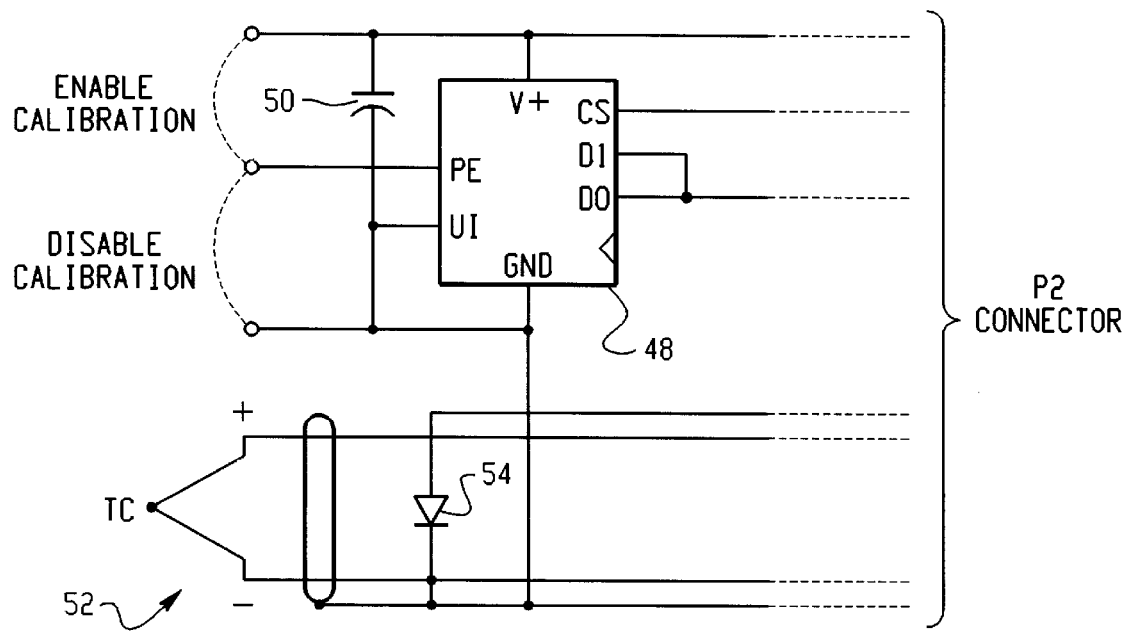
FIG. 9 is a schematic diagram illustrating in greater detail a smart temperature sensing device according to another embodiment including a thermocouple-type temperature sensor and the memory.

FIG. 9 is a schematic diagram illustrating the EEPROM 48 operating in conjunction with a thermocouple sensor 52. The EEPROM 48 operates in a similar fashion as described in conjunction with FIG. 7 and operates to enable calibration by clocking in the calibration coefficients from the processor 28. Subsequently the calibration coefficients data resident within the EEPROM 48 can be read out to the memory 30 by the processor 28 for use in accurately calculating the temperature.

Although several embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A temperature sensing device, comprising:
    a sensor unit including a sensor operable to sense a temperature; and
    a memory integral to the sensor unit, wherein the memory contains nonlinear calibration data which characterize the sensor and wherein the nonlinear calibration data is independent of conversion circuitry which utilizes the nonlinear calibration data in converting a signal representative of the sensed temperature into an output indicative of the temperature.

2. The temperature sensing device of claim 1, wherein the nonlinear calibration data comprises historical data that reflects nonlinear behavior of a particular class of sensors.

3. The temperature sensing device of claim 1, wherein the nonlinear calibration data comprises custom data which uniquely characterizes the sensor.

4. The temperature sensing device of claim 1, wherein the nonlinear calibration data comprises a plurality of nonlinear calibration coefficients.

5. The temperature sensing device of claim 1, further comprising a connector for coupling a processor to the sensor and the memory, wherein the processor is operable to access the nonlinear calibration data from the memory and receive an electrical signal from the sensor which is indicative of the temperature at the sensor, and to convert the electrical signal using the nonlinear calibration data into a temperature value which represents the temperature at the sensor.

6. The sensing device of claim 5, further comprising a noise suppression circuit coupled between the sensor and the processor, wherein the noise suppression circuit eliminates noise, thereby providing a filtered signal to the processor, and wherein the filtered signal is indicative of the temperature at the sensor.

7. The sensing device of claim 5, further comprising an analog-to-digital converter coupled between the sensor and the processor, wherein the analog-to-digital converter is operable to convert the electrical signal from the sensor into a digital signal to be utilized by the processor.

8. The sensing device of claim 5, further comprising a display coupled to the processor for displaying the temperature value which represents the temperature at the sensor.

9. The sensing device of claim 1, wherein the sensor comprises a resistance temperature device.

10. The sensing device of claim 1, wherein the sensor comprises a thermocouple device.

11. The sensing device of claim 1, wherein the memory comprises an electrically erasable programmable read-only memory.

12. A smart temperature sensor system, comprising:
- a sensor on a sensor unit, operable to sense a temperature;
- a memory on the sensor unit, wherein the memory contains nonlinear calibration data which characterizes the sensor and wherein the nonlinear calibration data is independent of a processor; and
- the processor remote from the sensor unit and electrical communication with the sensor and the memory, wherein the processor receives the nonlinear calibration data from the memory and an electrical signal from the sensor, and wherein the processor utilizes the nonlinear calibration data to convert the electrical signal into a value that represents the temperature at the sensor.

13. The smart temperature sensor system of claim 12, wherein the nonlinear calibration data comprises historical data that reflects nonlinear behavior of a particular class of sensors.

14. The smart temperature sensor system of claim 12, wherein the nonlinear calibration data comprises custom data which uniquely characterizes the sensor.

15. The smart temperature sensor system of claim 12, wherein the nonlinear calibration data comprises a plurality of nonlinear calibration coefficients.

16. The smart temperature sensor system of claim 12, wherein the processor communicates with the sensor and the memory through a wired connection.

17. The smart temperature sensor system of claim 12, wherein the processor communicates with the sensor and the memory through an RF connection.

18. The smart temperature sensor system of claim 12, wherein the processor communicates with the sensor and the memory through an IR connection.

19. The smart temperature sensor system of claim 12, further comprising a noise suppression circuit coupled between the sensor and the processor, wherein the noise suppression circuit eliminates noise, thereby providing a filtered signal to the processor which is indicative of the temperature at the sensor.

20. The smart thermal sensor system of claim 12, further comprising an analog-to-digital converter coupled between the sensor and the processor, wherein the analog-to-digital converter is operable to convert the electrical signal from the sensor into a digital signal to be subsequently received by the processor.

21. The smart thermal sensing system of claim 12, further comprising a display coupled to the processor for displaying a temperature value which represents the temperature at the sensor.

* * * * *